(12) United States Patent
Carroll, III et al.

(10) Patent No.: US 6,199,942 B1
(45) Date of Patent: Mar. 13, 2001

(54) MODULAR ENERGY ABSORBING ASSEMBLY

(75) Inventors: Phillip Patrick Carroll, III, Bloomfield Hills; Joel Matthew Cormier, Ferndale; Donald Scott Smith, Commerce Township; Richard Francois Audi, Dearborn, all of MI (US)

(73) Assignee: Oakwood Energy Management, Inc., Dearborn, MI (US)

( * ) Notice: Subject to any disclaimer, the term of this patent is extended or adjusted under 35 U.S.C. 154(b) by 0 days.

(21) Appl. No.: 09/328,196

(22) Filed: Jun. 8, 1999

Related U.S. Application Data (63) Continuation-in-part of application No. 09/018,666, filed on Feb. 4, 1998, now Pat. No. 6,017,084.

(51) Int. Cl.$^7$ .................................................. B60R 21/04
(52) U.S. Cl. .................. 296/189; 293/132; 280/751; 188/377
(58) Field of Search .................. 296/189, 39.1; 293/102, 132, 133, 109, 110; 280/751, 748; 206/521.4, 521.9; 188/377

(56) References Cited

U.S. PATENT DOCUMENTS

| | | |
|---|---|---|
| 2,349,907 | 5/1944 | Kos et al. . |
| 3,871,636 | 3/1975 | Boyle . |
| 3,933,387 | 1/1976 | Salloum et al. . |
| 3,997,207 | 12/1976 | Norlin . |
| 4,029,350 | 6/1977 | Goupy et al. . |
| 4,154,469 * | 5/1979 | Goupy et al. ............ 293/120 |
| 4,190,276 | 2/1980 | Hirano et al. . |
| 4,321,989 | 3/1982 | Meinzer . |
| 4,352,484 | 10/1982 | Gertz et al. . |
| 4,413,856 | 11/1983 | McMahan et al. . |
| 4,578,296 | 3/1986 | Miyazaki et al. . |
| 4,635,981 | 1/1987 | Friton . |
| 4,666,130 | 5/1987 | Denman et al. . |
| 4,720,261 | 1/1988 | Fishwick et al. . |
| 4,844,213 | 7/1989 | Travis . |
| 4,909,661 | 3/1990 | Ivey . |
| 5,033,593 | 7/1991 | Kazuhito . |
| 5,141,279 | 8/1992 | Weller . |
| 5,165,990 | 11/1992 | Nakano . |
| 5,192,157 | 3/1993 | Laturner . |
| 5,306,066 | 4/1994 | Saathoff . |
| 5,364,682 | 11/1994 | Tanaka et al. . |
| 5,425,561 | 6/1995 | Morgan . |
| 5,435,619 | 7/1995 | Nakae et al. . |
| 5,500,037 | 3/1996 | Alhamad . |
| 5,573,272 | 11/1996 | Teshima . |
| 5,636,866 | 6/1997 | Suzuki et al. . |
| 5,660,426 | 8/1997 | Sugimori et al. . |
| 5,700,545 | 12/1997 | Audi et al. . |
| 5,727,826 | 3/1998 | Frank et al. . |
| 5,746,419 | 5/1998 | McFadden et al. . |
| 5,762,392 | 6/1998 | Suga . |
| 5,769,003 | 6/1998 | Rose et al. . |
| 5,836,641 | 11/1998 | Sugamoto et al. . |
| 5,950,835 | 9/1999 | Moser et al. . |
| 6,085,878 * | 7/2000 | Araki et al. ............ 188/377 |

* cited by examiner

Primary Examiner—Joseph D. Pape
(74) Attorney, Agent, or Firm—Brooks & Kushman P.C.

(57) ABSTRACT

An energy absorbing assembly is provided for decelerating an object that impacts the assembly. The assembly comprises at least one energy absorbing member for accommodating deformation of the assembly. The assembly comprises a base and at least energy absorbing module associated therewith. The at least one energy absorbing module is formed from a group consisting of structure (A) and structure (B). Structure (A) is a metal lattice which supported by the thermoformed base. Structure (B) comprises of plurality of recesses, each having a floor and a wall. Together, structures (A) and (B) and combinations thereof afford a user-determinable resistance to impact.

14 Claims, 11 Drawing Sheets

MODULAR ENERGY ABSORBING ASSEMBLY

CROSS-REFERENCE TO RELATED APPLICATION

This application is a continuation-in-part of application Ser. No. 09/018,666, filed on Feb. 4, 1998, now U.S. Pat. No. 6,017,084.

TECHNICAL FIELD

This invention relates to a modular energy-absorbing member for decelerating an object that impacts the member or the assembly in which the member is placed.

BACKGROUND ART

In many fields it is desirable to provide assemblies which are able to decelerate, in a given, limited distance, an object which impacts the assembly. To do so, the assembly must absorb a significant percentage of the impact energy transferred by the object. In the past, this has been accomplished physically by providing the assembly with an energy absorbing member for supporting deformation of the assembly in order to absorb the energy of the impacting object. Alternative approaches are exemplified by commonly owned U.S. Pat. No. 5,700,545 and U.S. Ser. No. 09/018,666, filed on Feb. 4, 1998, which are incorporated herein by reference.

Within a vehicle, for example, occupants require protection from impact with interior components such as the pillars and headrails. These structures are typically made of steel tubing or steel channels which are welded together to form the structural cage or unitized body for the vehicle. Designers have attempted to place energy absorbers over the pillars, headrails and other parts of a vehicle to protect the vehicle occupants. Prior art approaches are found in the use of energy absorbing urethanes, rigid polymeric foams, blocks or cells or vanes of engineered plastics, various sheet metal configurations, metal beams, honeycombed metal, and other geometric solids. Most of these materials, however, while crushing generally absorb less than the desired amount of energy for a given displacement.

The desired response of an energy absorbing material from initial loading to failure is one wherein a near "square wave" response of force versus deflection is produced, such that the force exerted on the decelerated object is nearly unchanged over a desired range of crush distance or deflection. Commonly owned U.S. Pat. No. 5,700,545 issued to Audi et al. discloses such an energy absorbing structure, which is herein incorporated by reference. The energy absorbing member disclosed therein comprises an array of material, such as expanded metal, configured with vertical supporting faces which are generally orthogonal to spacing faces lying in the plane of an incident surface. While the energy absorption characteristics of such a structure are improved compared with those of the prior art, due to its configuration only the supporting faces, representing –50% of the absorbing member, are utilized in energy absorption. The spacing faces play little or no part in energy absorption since they generally lie in a plane orthogonal to the direction of impact.

Therefore, a need exists for an energy absorbing assembly which maximizes the use of energy absorbing members, so that maximum collapsible material is harnessed to produce superior energy absorbing characteristics and optimize the amount of energy absorbed per unit mass and per unit deflection of the energy absorbing member compared with prior art structures.

The amount of energy that is desired to be absorbed by the absorbing assembly depends on the kinetic energy of the object to be decelerated and the deflection of the background structure when impacted by the object. In the case of automotive interiors, the automobile body or cage deflects to a degree when impacted by occupants. The degree of deflection varies through the vehicle cage for a given amount of impact energy. So the energy absorbing structure is required to absorb different amounts of energy at different locations in the vehicle. The amount of crush space available also varies.

Thus, it would be desirable, additionally to provide a modular energy absorbing assembly wherein constituent modules offer different degrees of resistance to impact forces. Further, it would be useful to provide such a module wherein the material which supports each module is itself formed from an energy absorbing structure.

SUMMARY OF THE INVENTION

It is an object of the present invention to provide a thermoformed energy absorbing assembly which decelerates an impacting object in a given, limited distance after engagement with the assembly, wherein various modules or areas of the assembly offer different degrees of resistance to impact forces, thereby allowing the designer to customize the assembly according to the requirements of the environment in which it is deployed.

It is another object of the present invention to form holders integral in the assembly in which wires tubes, ducts, etc. may be placed without the need to use additional attachments such as clips, adhesives, etc.

It is a further object of the present invention to provide an energy absorbing assembly that maximizes the energy absorption over a given distance as compared with prior art structures, while affording economies in manufacturing.

It is a still further object of the present invention to provide an energy absorbing assembly which absorbs energy in a near square-wave manner.

It is another object of the present invention to provide an energy absorbing assembly which is adapted for mounting on a vehicle in order to provide impact protection.

Accordingly, a thermoformed energy absorbing assembly is provided for decelerating an object that impacts the assembly. The assembly includes a base and at least one energy absorbing module associated with the base for accommodating deformation of the assembly. The at least one energy absorbing module comprises a structure selected from the group consisting of a first structure, termed herein as structure (A) and a second structure, termed herein structure (B). Structure (A) comprises a lattice of interconnected strands, the strands intersecting to define a plurality of cells and being supported within a channel formed within the base. The structure (A) is oriented such that the plane of each cell is substantially parallel to the impacting force in order to maximize energy absorption over a given distance. The lattice collapses and at least some of the cells become at least partially closed during energy absorption.

The modules may be separate pieces or modular sections or merely areas of the same piece may be designed with varying absorbing characteristics between them. Alternatively, each piece may be designed to have the same absorbing characteristics. Pieces of different designs may then be placed next to or in close proximity to each other to afford a generally continual energy absorbing function.

Structure (B) includes a plurality of cup-or other-shaped recesses, each having a floor and a frusto-conical wall defined within the base. The structure (B) is oriented such that the floor of each cup is substantially orthogonal to the impacting force. Its frusto-conical wall is substantially parallel to the impacting force in order to maximize energy absorption by the wall over a given distance. The wall at least partially collapses and at least some of the cups become at least partially compressed during energy absorption. The shape of the cups in the structure (B) in the plan view may be circular, oval, triangular, hexagonal or any other polygonal shape.

Structures (A) and (B) afford the designer a user-determinable resistance to impacting forces.

The above objects and other objects, features, and advantages of the present invention are more readily understood from a review of the attached drawings and the accompanying specification and claims.

BRIEF DESCRIPTION OF THE DRAWINGS

FIG. 7 is a force-deflection graph for the energy absorbing member of the present invention in which the cells are aligned such that the minor axis is generally parallel to the direction of impact.

BEST MODES FOR CARRYING OUT THE INVENTION

Figure 1:
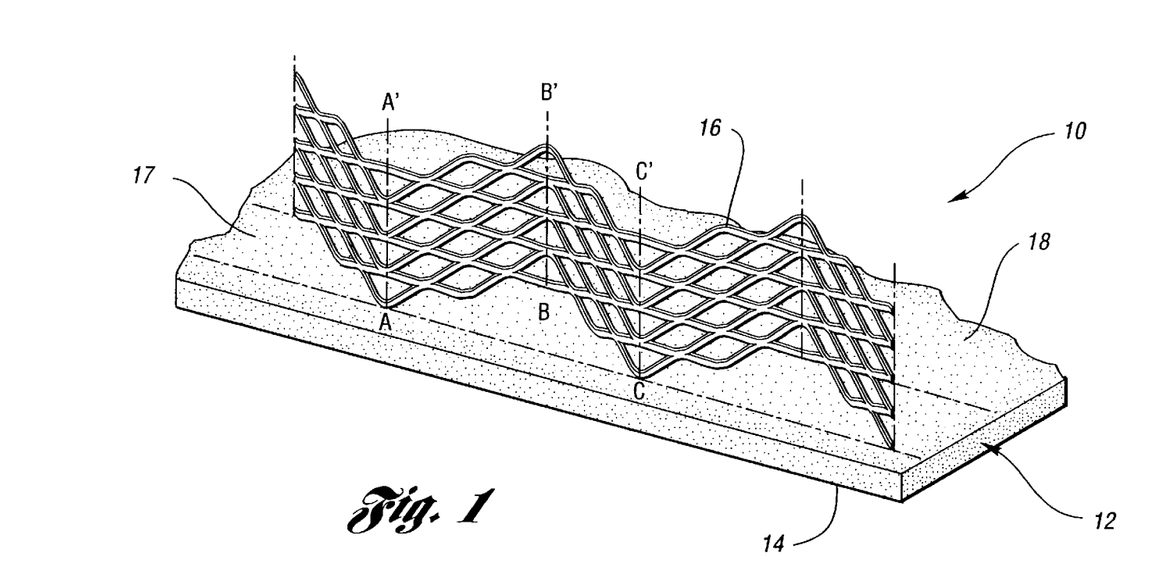
FIG. 1 depicts a perspective view of the energy absorbing assembly of the present invention.

Referring first to FIG. 1, there is depicted an energy absorbing assembly 10 for decelerating an object (not shown) that impacts the assembly. In the preferred embodiment, assembly 10 comprises an incident member 12 having an incident surface 14 that meets the impacting object. At least one energy absorbing member 16 is attached to an attachment region 17 of an opposing face 18 of incident member 12 for accommodating deformation of assembly 10.

Figure 2:
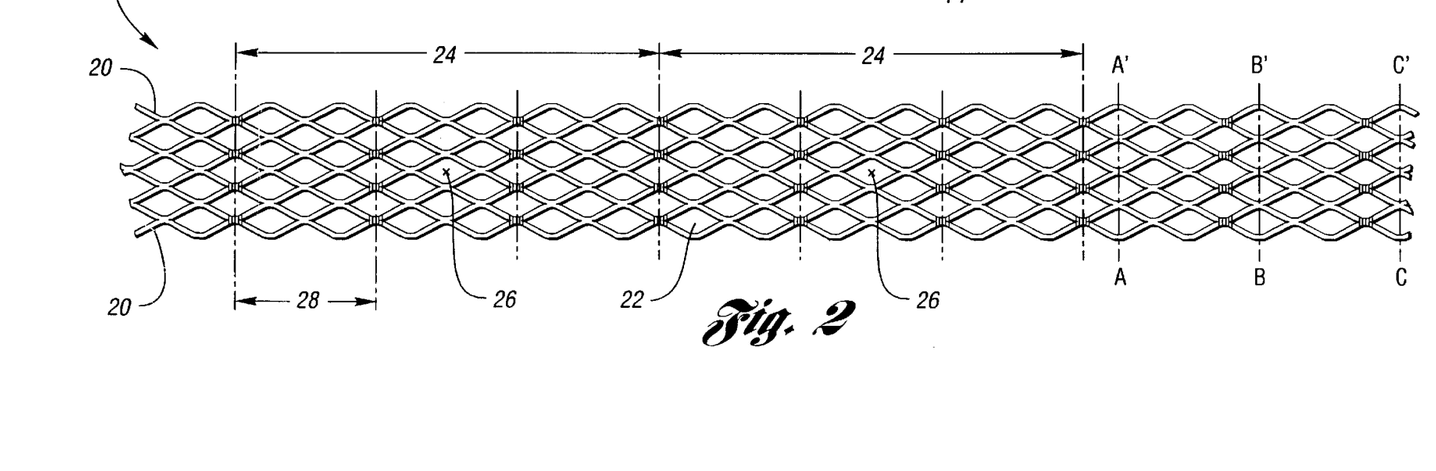
FIG. 2 is a side elevational view of a planar embodiment of the energy absorbing member of the present invention.

Referring now to FIG. 2, each energy absorbing member 16 comprises a lattice of interconnected strands 20 of a material, such as expanded metal, which provides assembly 10 with the characteristic energy absorption. The expanded metal from which energy absorbing member 16 is preferably formed is available from sources such as the McNichols Company of Tampa, Fla. The material is available in numerous styles and can be constructed of various materials, depending upon the desired energy absorption characteristics of assembly 10. Representative materials include carbon steel, ASTM-F-1267-9-1, HD galvanized steel, aluminum (5005 H 34), stainless steel type 304, stainless steel type 316, and the like. If desired, a protective coating can be applied to the expanded metal to provide corrosion resistance.

Alternatively, the lattice could be composed of any form of steel, plastic, or composite material. It will be apparent to those skilled in the art that the lattice could be formed by perforating, expanding, burning, punching, laser cutting, or blanking a sheet. The lattice could be formed by molding, casting, or other solidification processes, or by welding, brazing, or other joining processes. Following lattice formation, energy absorbing member 16 is preferably flattened by stamping, roll-forming, or other similar processes. Accordingly, the term "lattice" is meant to encompass these and their equivalent structures.

Strands 20 within energy absorbing member 16 intersect to define a plurality of cells 22 (FIG. 2). Cells 22 are preferably diamond-shaped before impact of the object, but cells 22 may be pie-shaped or polygonal having any number of sides, with the sides being curved or straight. The lattice structure is preferably configured to be 1–5 cells in height. In the preferred embodiment, energy absorbing member 16 is oriented such that the plane of each cell 22 is substantially perpendicular to attachment region 17 (best shown in FIG. 1), as illustrated by lines A–A', B–B', and C–C'. Using such a configuration, each cell may be effective in absorbing impact energy. The terminology "substantially perpendicular" is used to indicate the possible necessity of canting the energy absorption member 16, up to about 45 degrees, to compensate for curvature of incident member 12.

Figure 3:
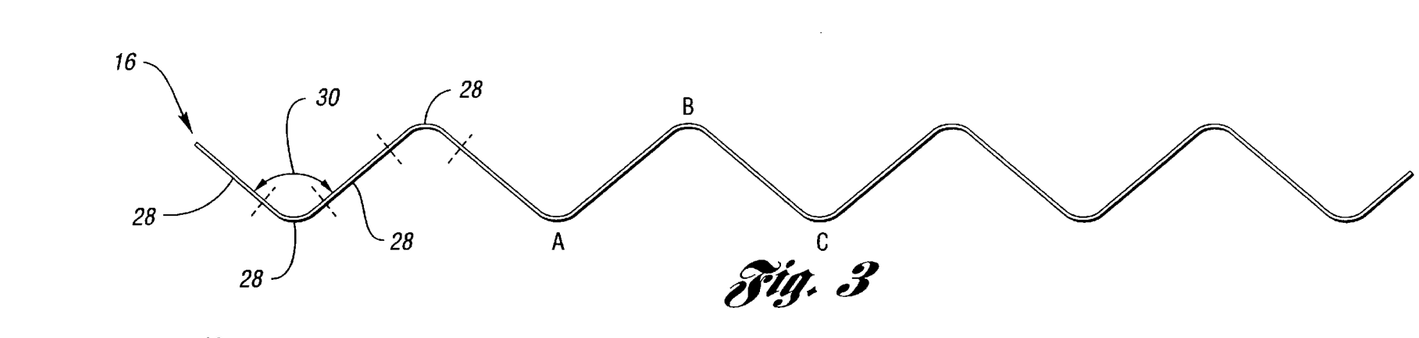
FIG. 3 is a top plan view of a serpentine embodiment of the energy absorbing member of the present invention.

Still referring to FIG. 2, the lattice structure of energy absorbing member 16 comprises a plurality of interconnected sectors 24, wherein each sector 24 has a center point 26. Sectors 24 may be coplanar, as depicted in FIG. 2, or may lie in different planes to form sawtooth, squared, serpentine, or any other type of configuration of energy absorbing member 16. Each sector 24 further includes a plurality of interconnected segments 28, which may be planar or curvilinear in form, as shown in FIG. 3. Planar and curvilinear segments are joined to form a preferred, generally serpentine configuration of energy absorption member 16. Points A, B, and C denoted in FIG. 3 correspond with points A, B, and C shown in FIG. 1. For a given curvilinear segment 28, the angle 30 within the segment may vary between almost 0 and 180 degrees. Preferably, the radius defined by angle 30 is 2 to 4 times the thickness of the energy absorbing material.

Figure 4:
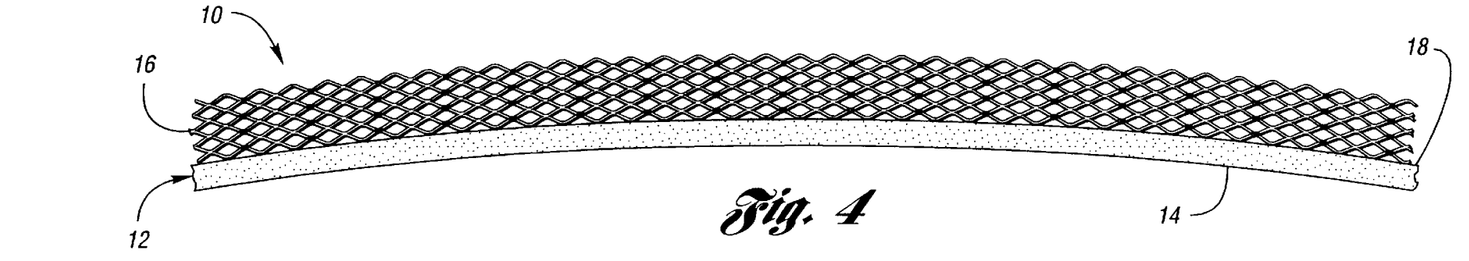
FIG. 4 is a side view of a planar embodiment of the energy absorbing member as it is deformed in a plane perpendicular to the incident surface.
Figure 5:
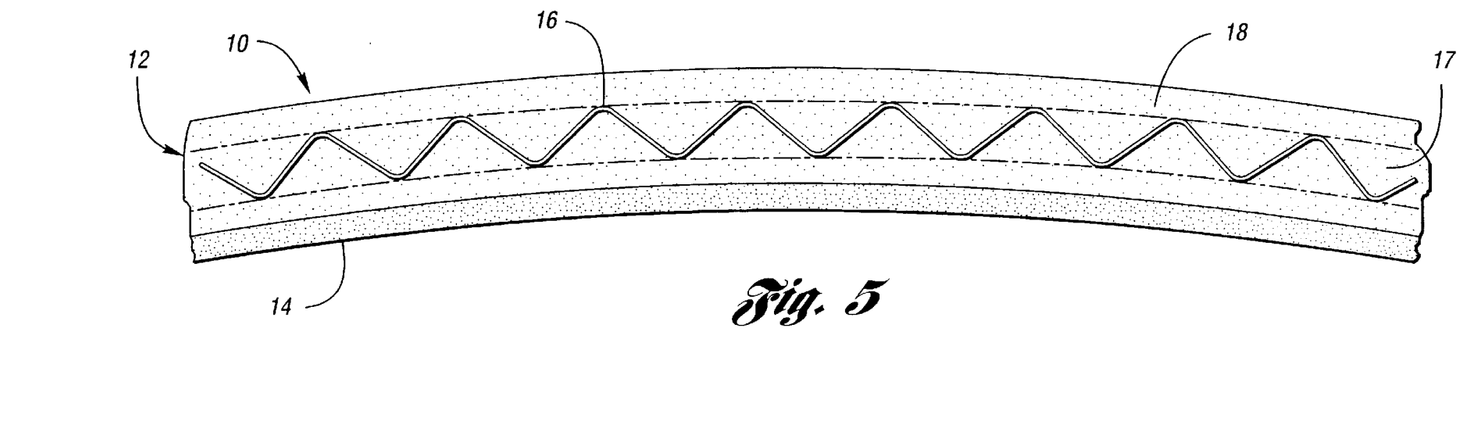
FIG. 5 is a top view of a serpentine embodiment of the energy absorbing member as it is deformed in a plane parallel to the incident surface.

As depicted in FIG. 4, any embodiment of energy absorbing member 16 may be deformed within a plane which is substantially perpendicular to incident surface 14, in order to conform to the curvature of incident member 12, which in some cases, may not be perfectly flat. Similarly, any configuration of energy absorbing member 16 may also be deformed within a plane which is substantially parallel to incident surface 14, as illustrated by the top view of FIG. 5.

Figure 6:
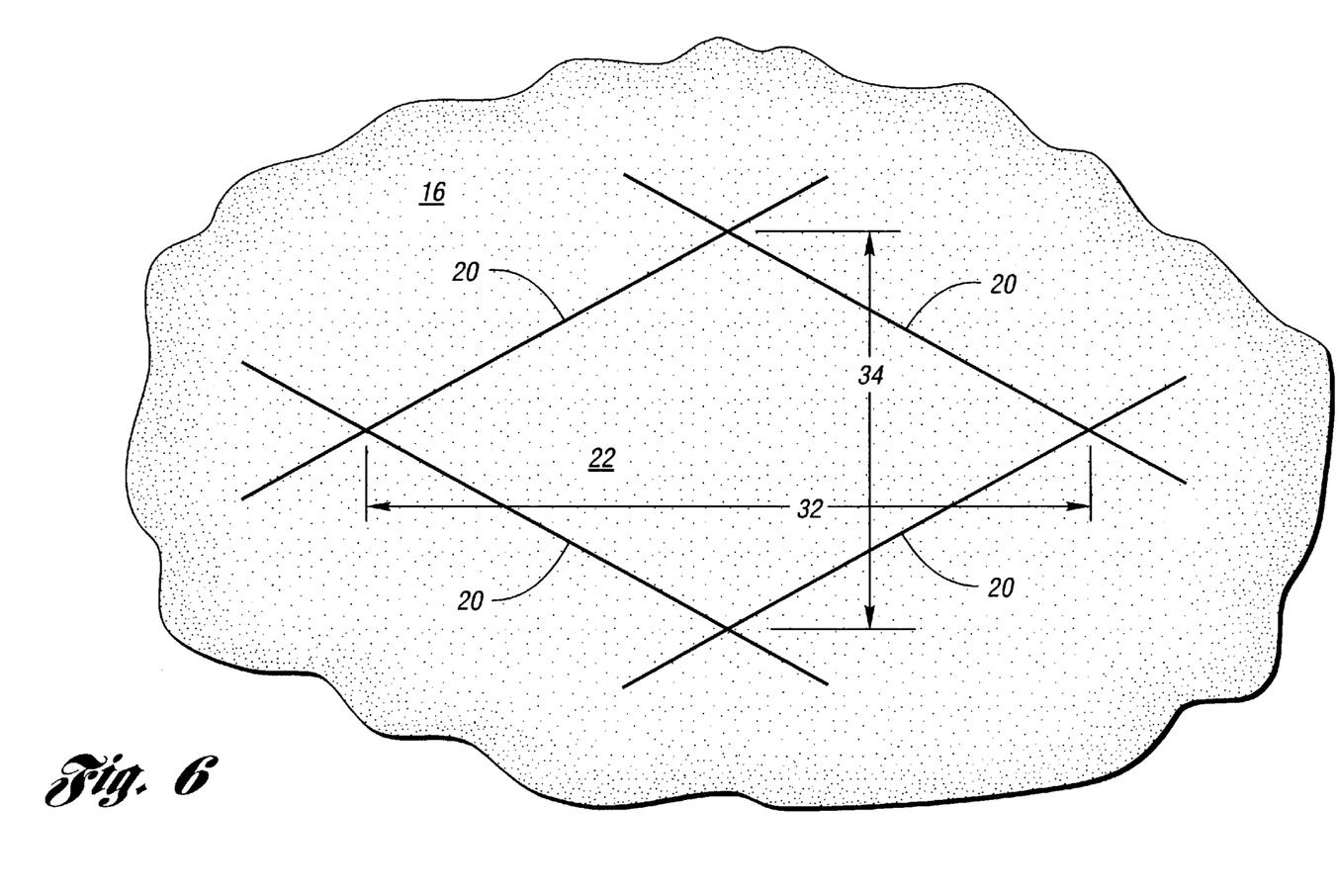
FIG. 6 is an enlarged, fragmentary view of a single cell within the energy absorbing member of the present invention.

Referring now to FIG. 6, a representative cell 22 within energy absorbing member 16 is shown. Each cell 22 is defined by a major axis 32 and a minor axis 34, wherein major axis 32 is longer than minor axis 34. In the preferred embodiment, each cell 22 is oriented such that its minor axis 34 is substantially perpendicular to incident surface 14 and its major axis 32 is substantially parallel to incident surface 14, for reasons to be explained below.

The cells 22 within the lattice cooperate to provide a concatenated, progressive reaction to the impact forces generated by a collision of an object with energy absorbing assembly 10. As compression proceeds, the cells 22 become flattened in an analogous manner to that of the bellows of an accordion upon being squeezed. Ultimately, however, the lattice is no longer able to absorb the impact force. At that point, cells 22 become collapsed, and energy absorbing member 16 yields more so as a collapsing column. Nevertheless, during energy absorption the reaction to the impact forces has remained substantially constant during compression of the lattice, as will be shown below.

The actual deformation mechanics on a microstructural or finite element level are more detailed and/or complex. It should be recognized that the disclosed invention encompasses all possible strand conformations and deformation mechanics.

The quality of the energy absorbing characteristics of an absorber may be defined by a shape factor which is calculated by integrating an actual force-deflection curve for the absorber over a given crush distance to determine the actual energy absorbed, and then dividing this quantity by the maximum force over the defined distance multiplied by the defined distance. This calculation has the effect of dividing the actual area under the curve by a perfect square-wave. Consequently, a shape factor approaching 1.0 indicates an absorber with better energy absorbing characteristics than a shape factor approaching 0.

Figure 8:
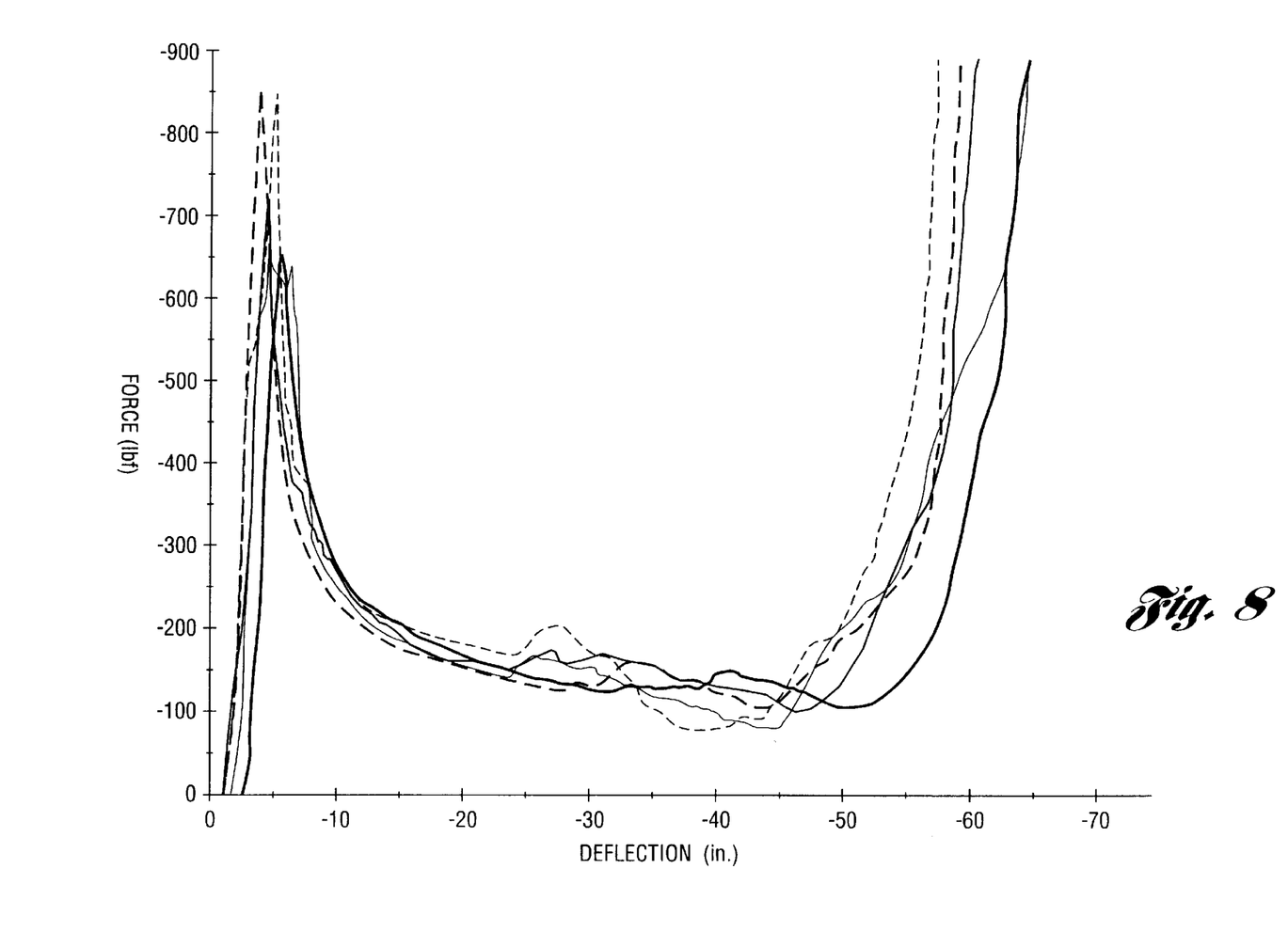
FIG. 8 is a force-deflection graph for the energy absorbing member of the present invention in which the cells are aligned such that the major axis is generally parallel to the direction of impact.

FIGS. 7 and 8 show force-deflection curves for samples of energy absorbing member 16, wherein member 16 is composed of 3/16"-22 gage flattened expanded metal, member 16 is arranged in a serpentine configuration, and cells 22 are diamond-shaped. In FIG. 7, energy absorbing member 16 was oriented such that minor axis 34 was generally parallel to the direction of impact. As shown, the force absorbed by energy absorbing member 16 per unit of displacement rises upon impact, then remains substantially constant over a displacement of over 50% of the original height of the energy absorbing lattice. Thus, the force-deflection curves assume a near square wave characteristic, as indicated by their average shape factor of 0.8 or higher. It is desirable that the force-deflection curve have somewhat rounded corners, so that the object is not instantaneously accelerated or decelerated by the impacting force.

In FIG. 8, energy absorbing member 16 was oriented such that major axis 32 was generally parallel to the direction of impact. It can be seen these curves do not exhibit a near square wave characteristic, which is indicated by their average shape factor of 0.4 or lower. Furthermore, the force "spike" present in each curve can adversely decelerate the object, and increase the potential for damage or bodily injury. Therefore, the orientation of cells 22 wherein minor axis 34 is substantially parallel with the direction of impact constitutes the preferred embodiment of the present invention.

Force-displacement characteristics have been measured for a variety of lattice structures of energy absorbing member 16. It has been found that section length, bend angle, section height, strand width, strand thickness, and degree of flattening as well as a number of processing variables all impact the shape factor.

Another way of characterizing the performance of an energy absorbing member is to measure the acceleration vs. time curve for an object impacting the member. For many materials, including most metals, the dynamic acceleration vs. time curve for an object traveling at a speed of over ~2 mph is similar to the static force-deflection curve measured at slow rates of crushing, on the order of ~0.01 mph.

A plot of acceleration vs. time is typically used to measure the performance of a human headform impacting the interior of a motor vehicle. By convention, this measurement is defined as the "Head Injury Criterion" and denoted most recently by HIC(d). HIC(d) is calculated according to Federal Motor Vehicle Safety Standard 201, which is incorporated herein by reference. The headform by convention is usually taken as 10 lbs. in weight and approximates the shape of the human head, and travels at a speed of 15 mph.

If the performance of a headform is measured upon impact with the unitized body or cage of a motor vehicle lacking any trim cover or energy absorbing members, HIC (d) is typically measured to be greater than 2000, and sometimes above 3000. HIC(d) can be lower if the cage is relatively flexible, the headform hits at a glancing angle, or an aesthetic trim cover is installed. Designers prefer HIC(d) to be less than 1000, and sometimes less than 800.

According to the above-described parameters for HIC(d) determination, a number of dynamic tests of the energy absorbing member of the present invention were conducted. Measurements of HIC(d) were collected using a drop tower test stand and a trim cover attached to a vehicle A pillar, which normally extends upwardly between the windshield and front door window from the lower body to the roof on both sides of a vehicle. In a first test, energy absorbing plastic vanes were molded into the trim cover, resulting in an HIC(d) of 1428. In a second test, the energy absorbing member in a serpentine embodiment of the present invention was attached to the trim cover. The energy absorbing member contained diamond-shaped cells and was arranged such that the minor axis of the cells was parallel to the direction of impact. For the four samples tested, the HIC(d) averaged a greatly reduced value of 723.

In the preferred embodiment, energy absorbing assembly 10 also includes means for attaching the incident member to a support surface, such as a pillar or headrail of a vehicle. Attachment means include glue, insert molding, press fits, snap fits, heat staking, fasteners, welding, brazing, or other metal joining methods.

Figure 9:
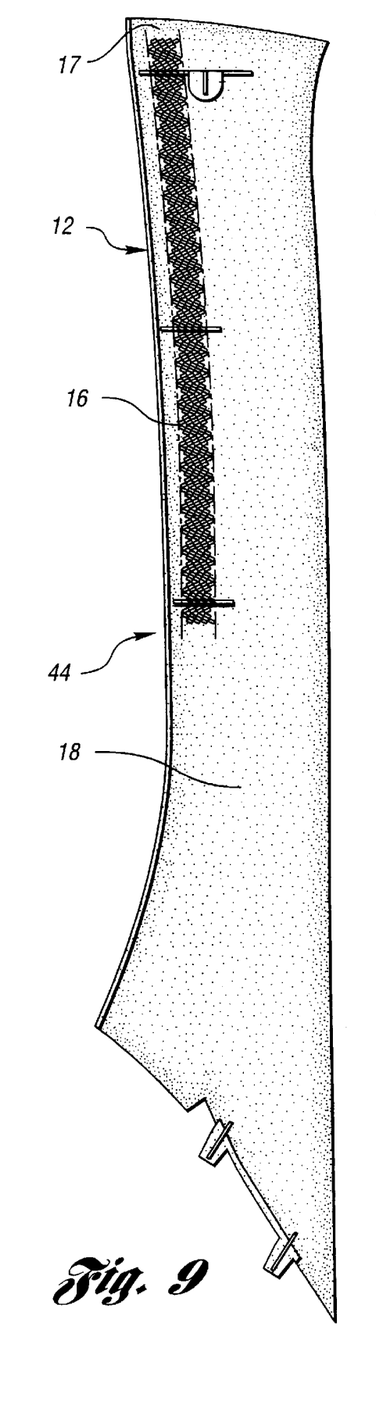
FIG. 9 shows an energy absorbing member attached to a typical vehicle A pillar cover.
Figure 10:
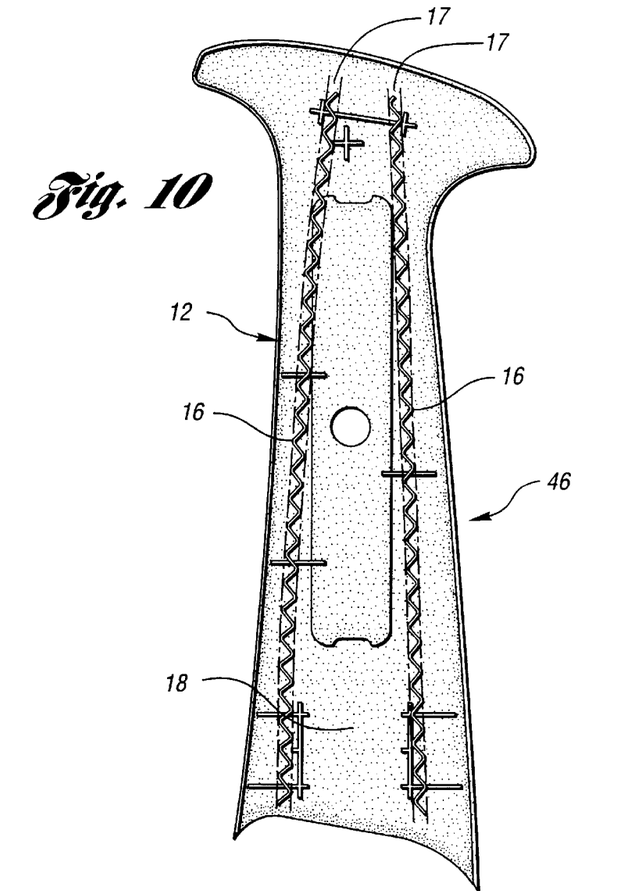
FIG. 10 shows an energy absorbing member attached to a typical vehicle B pillar cover.

FIGS. 9 and 10 show examples of energy absorbing member 16 attached to the attachment region 17 of a vehicle A pillar cover 44 and a vehicle B pillar cover 46, respectively. The vehicle B pillar extends upwardly to the roof at a location just behind the front door on both sides of a vehicle. While energy absorbing member 16 is shown placed in a generally vertical direction on A pillar cover 44 (FIG. 8) and B pillar cover 46 (FIG. 9), energy absorbing member 16 may be placed in other orientations.

Figure 11:
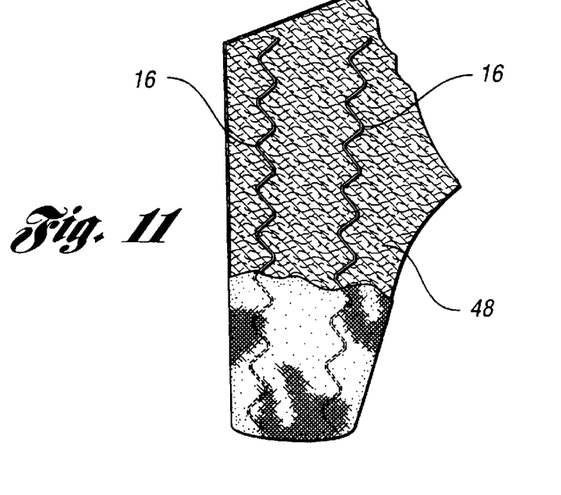
FIG. 11 shows an energy absorbing member encased within a filler material.

FIG. 11 depicts energy absorbing members 16 disposed at least partially within a filler material 48, such as a polymeric material, a foam, a gas, or mixtures thereof. Such a configuration might be utilized to protect a vehicle headrail, which is attached to the tops of the vehicle A and B pillars to form the perimeter of the roof of the vehicle. Impregnation of such substances within energy absorbing assembly 10 may improve wall buckling resistance. Various materials may also be placed interstitially within energy absorbing assembly 10 to provide rebound, including metal springs and polymers exhibiting elasticity.

Other support surfaces associated with a vehicle include an instrument panel, a seat, a seat back, an integrated seat restraint mechanism, a door panel, door mounted hardware, a dome light, an overhead console, pillar-mounted safety restraint hardware, a headliner, a bumper, a knee bolster, a seat anti-submarine ramp, and a steering column. All are intended to lie within the scope of the term "support surface" as used herein.

It should be understood that the applications of energy absorbing assembly 10 are not limited to vehicles. In the aviation field, energy absorbing assembly 10 may be used for arresting gear and landing gear, plus interior energy absorbers to protect occupants. In the sports arena and other personal protection equipment markets, the disclosed assembly 10 may usefully be embodied in head gear (helmets for football, skiing, hockey, etc.), teeth guards, and knee, hip, elbow and shoulder pads. The disclosed invention also finds utility in shipping carton protectors which would replace or supplement existing foams. Further, energy absorbing assembly 10 could be used as a mounting for earthquake-resistant buildings and structures.

Figure 12:
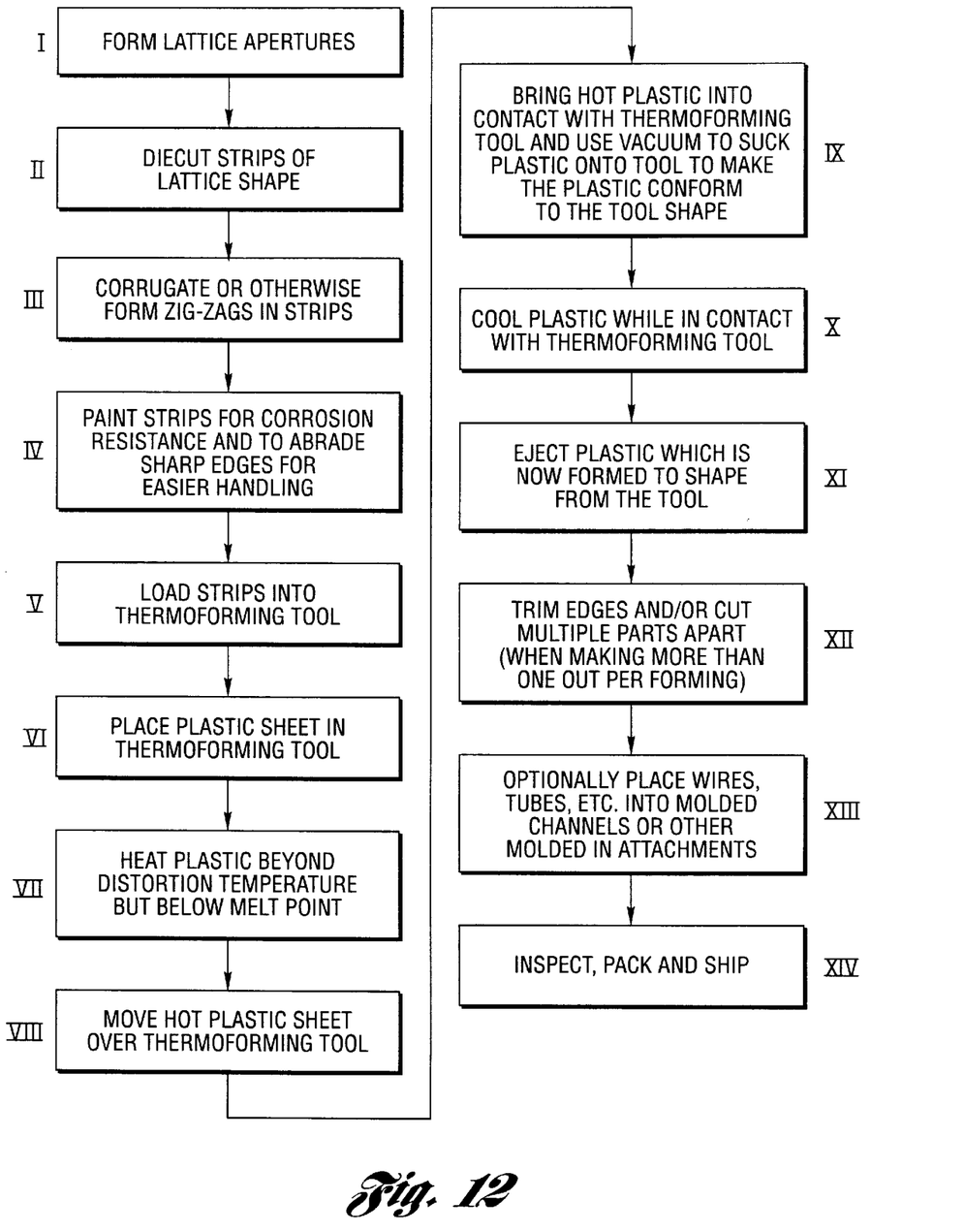
FIG. 12 is a schematic of the manufacturing process for making the modular energy absorbing assembly.

FIG. 12 depicts the main steps involved in the manufacturing process of the modular energy absorbing assembly. Step I involves forming the lattice apertures, followed by strips of the lattice being formed in a desired shape by a process such as die cutting. Next (Step III), the strips are corrugated into a zig-zag configuration. Optionally (Step IV), the strips may be painted for corrosion or otherwise treated for corrosion resistance and sharp edges can be dulled by abrasion for ease of handling. In Step V, the strips are loaded into a thermoforming tool, which is depict in FIG. 13.

In Step VI, a plastic sheet is placed into the thermoforming machine. The plastic is then heated beyond its distortion temperature but below its melting point (Step VII).

Next, (Step VIII), the hot plastic sheet is moved over the thermoforming tool. In Step IX, the hot plastic is brought into contact with the thermoforming tool and a vacuum is applied to suck the plastic onto the tool to make the plastic conform to the tool's shape.

The plastic is then cooled (Step X) to file in contact with the thermoforming tool. The plastic is then ejected (Step XI) which now has assumed the shape of the tool. Edges are then trimmed (Step XII) and/or cut so that multiple parts may be formed (making more than one structure in the forming operation). Optionally (Step XIII) wires, tubes, etc, may be placed in channels, snap fits, recesses, or other attachments molded into the structure as it is thermoformed. Finally, (Step XIV) the product is inspected, packed, and shipped.

Figure 13A:
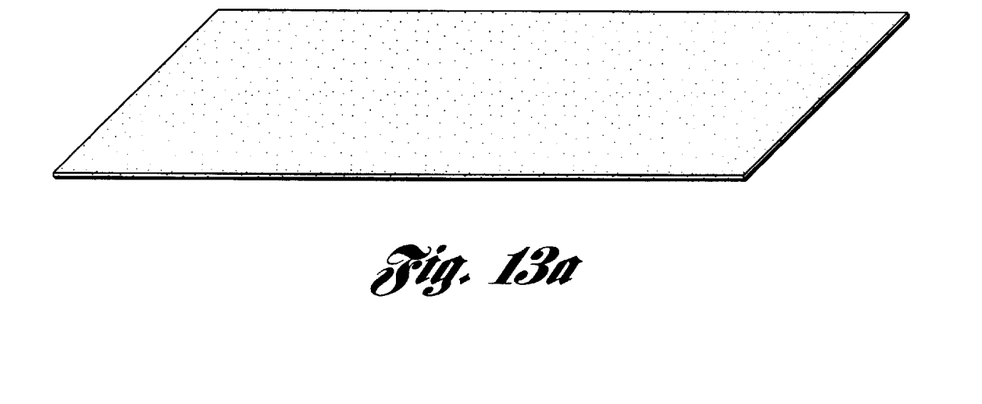
FIG. 13 illustrates a plastic sheet from which the base is thermoformed; the thermoforming tool, and a depiction of the finished part.
Figure 13B:
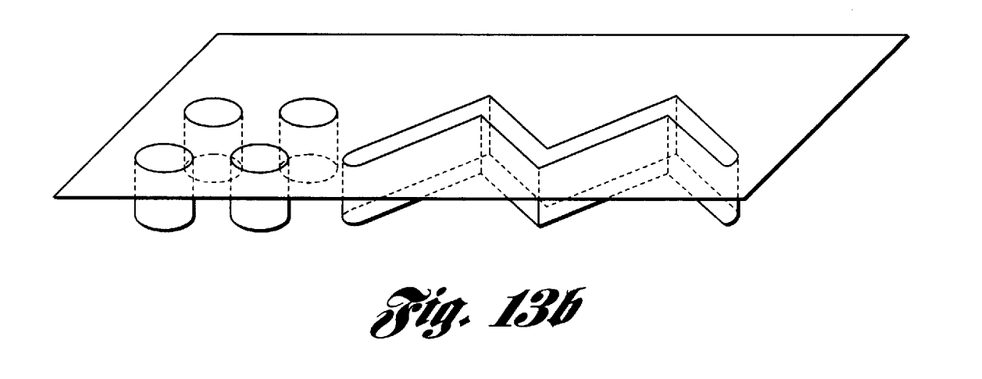
Figure 13C:
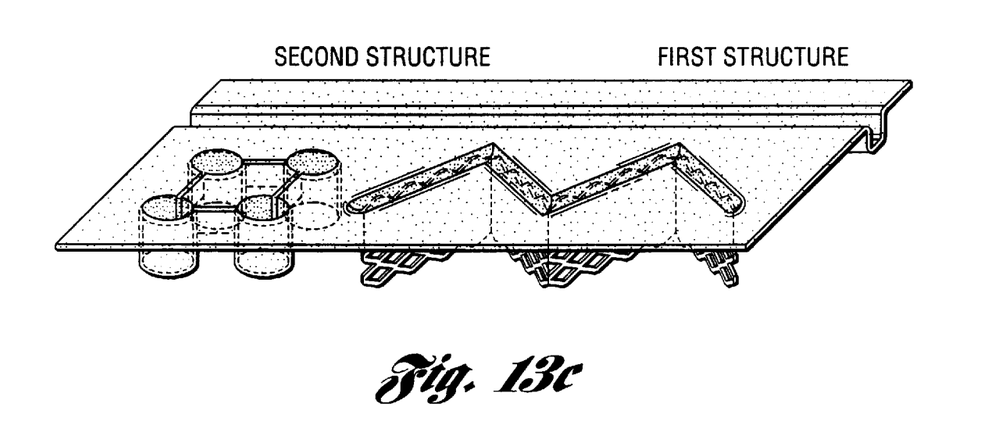
Figure 14:
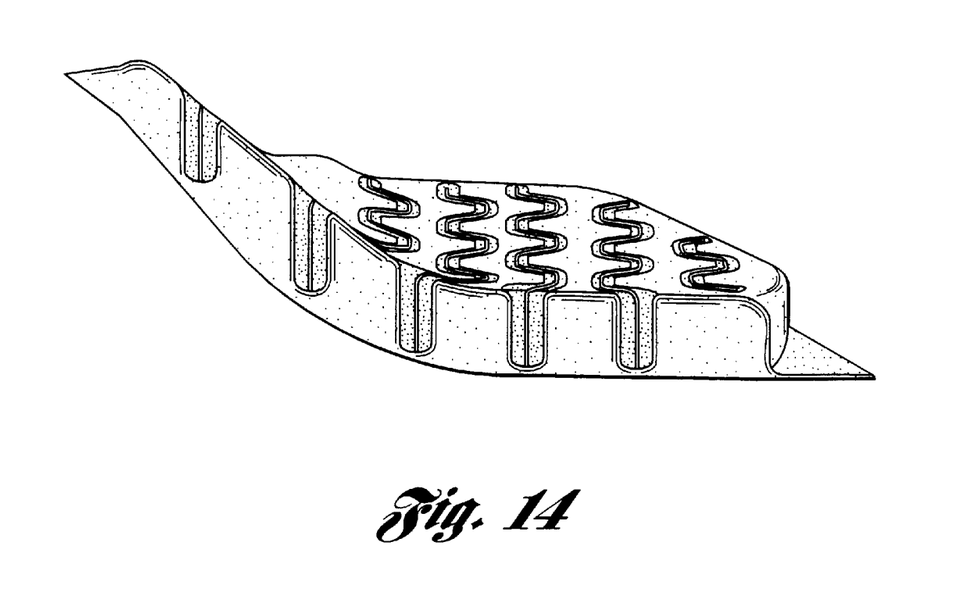
FIG. 14 is a perspective view of an underside of an energy absorbing module as embodied in structure (A)
Figure 15:
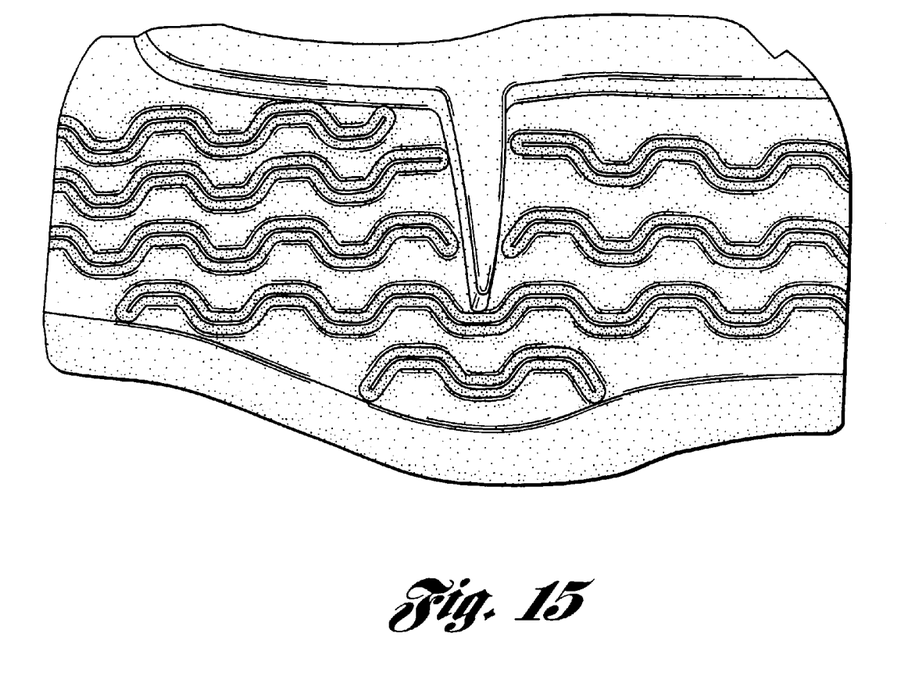
FIG. 15 is a top view of the structure depicted in FIG. 14.
Figure 16:
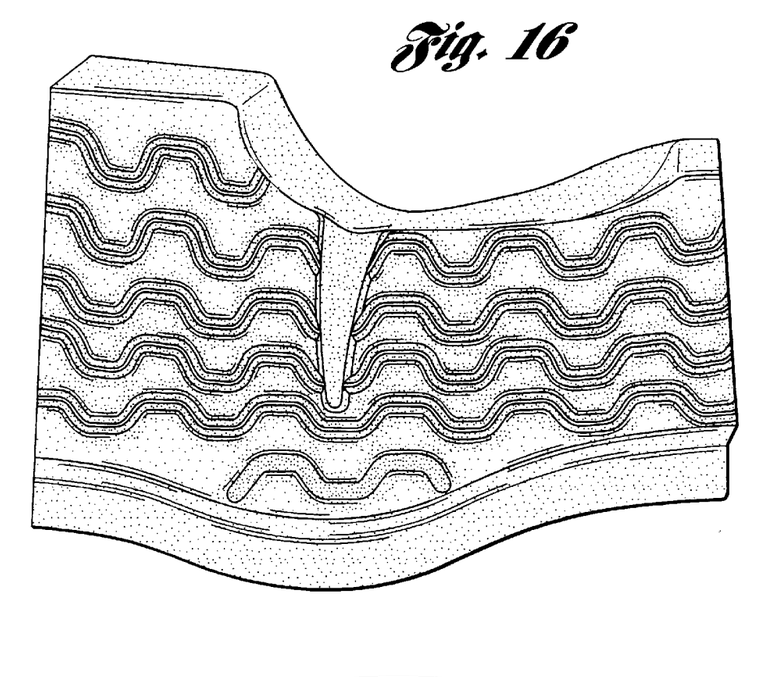
FIG. 16 is a bottom view of the structure depicted in FIGS. 14–15.
Figure 17:
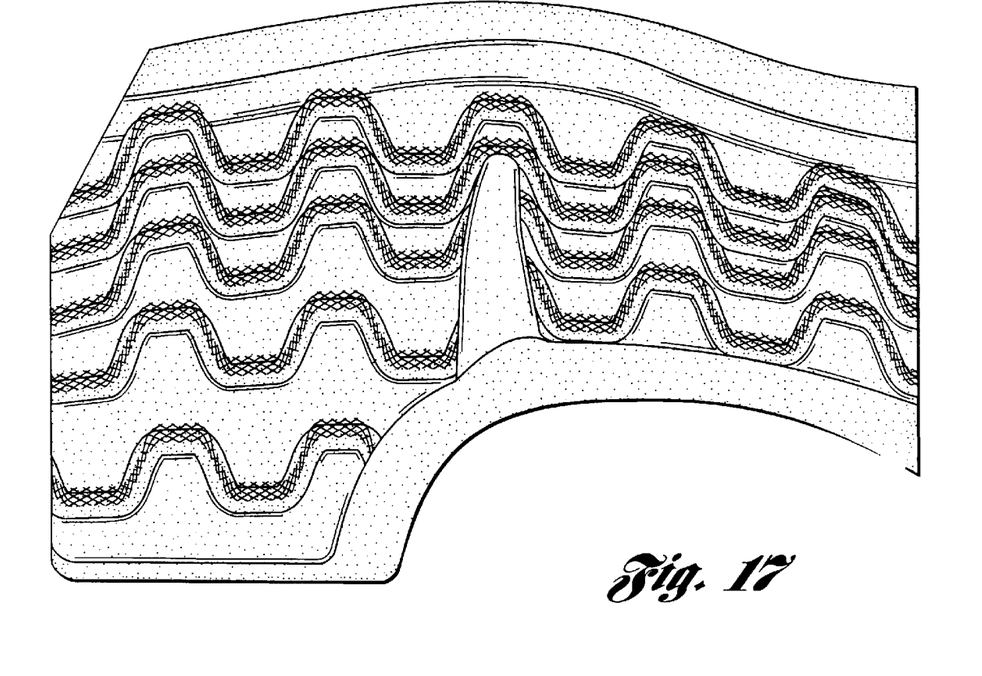
FIG. 17 is a top view of the structure depicted in FIGS. 15–16.

In FIG. 13, there is depicted a metal lattice of expanded metal which is inserted into female zig-zag depressions or channels defined within the thermoforming tool. These channels are generally shaped as in FIG. 13b. The long rectangular cross-section holds most of the absorbing member. The wider area, which can be shaped in a multitude of ways, serves to allow the thermoformed plastic to flow around the absorbing member and hold it in place. In FIG. 13, the cups may usefully be interconnected by ribs. If desired, the cups could be deployed so the centers lie at the intersections of walls forming a hexagon in the plan view and ribs may be formed between each cup. This would result in an essentially honeycomb shape. The energy absorbing assembly of the present invention is a structure having a nominal thickness between 7 and 25 millimeters for automotive head impact application. It absorbs energy more efficiency, is light in weight and less expensive to manufacture and molded rigid polyurethane foam. The finished part (structure A) is depicted in FIGS. 14–17.

Figure 18:
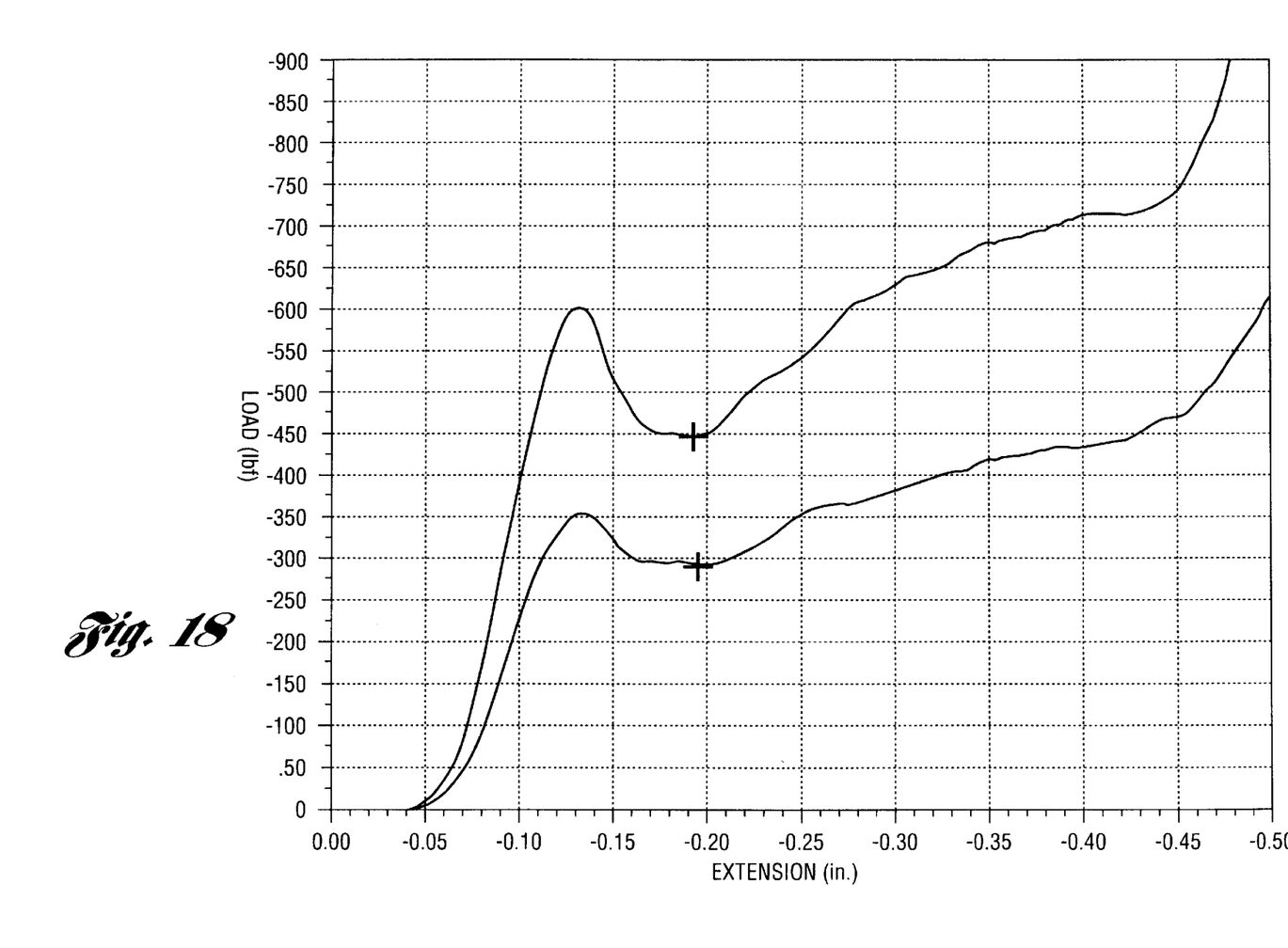
FIG. 18 is a force-deflection curve for a module of the energy absorbing member, wherein the module is structure (B). The structure (B) includes a plurality of cup-shaped recesses, each having a floor and a frusto-conical wall defined within the base.

FIG. 18 illustrates load-deflection characteristics of structure (B). It is noted that this shape factor is not as near 1.0 as is the case of metal lattice. However, the shape is generally square enough to afford energy absorption.

This force-reflection curve is taken either statically, i.e. a strain rate of about 1 inch per minute. The performance of a steel lattice structure varies relatively little with strain rate. Plastics, however, especially closed cell foam impact structures, can be characterized by performance which varies much more markedly depending upon strain rate. The base of the modular energy absorbing assembly comprises a thermoformed resin. Suitable materials include a polypropylene copolymer, e.g. Shulman Polytrope TPP 524-31, Rhe TECH HP 509; ABS (GE Cyclolas ZA5, Multibase ABS 802, e.g.), Polyester (DuPont Rynite 415 HP, Hoechst Impet 540 e.g.), Nylon (Custom Resins CRI NX1170-RV200, Monsanto Vydyne 66B, e.g.,), Polycarbonate (Dow Califre 302-E, Miles Makralon 6653, e.g.) or Thermoplastic elastomer (Himont HiFax RTA 3362-E, DuPont Alcryn ALC206OUT, e.g.).

Preferably, the plastic resin of choice is thermoplastic with a melt point below about 400° F., which permits plastic deformation and thermoforming. Also, the resin of choice should have a heat distortion temperature, i.e. temperature of which the plastic softens significantly, in excess of about 220–240° F. so that the part will perform over the range of temperatures of the interior of an automobile (−40 to +240° F.). Also, the resin of choice should have an IZOD impact strength which is as high as possible, a flex modulus in excess 250,000 psi to resist bending; and have an elongation at break of greater than 10–15% to allow plastic deformation, rather than brittle failure.

The disclosed invention is capable of useful deployment in several environments. These include the head impact area in a car. According to FMVSS201, this standard is being phased into all passenger cars and some other vehicles between September 1998-September 2002. The referenced locations include all "upper interior components", which includes predominately pillars, headrails and siderails. Other applications includes side impact, bumpers, knee bolsters, anti-submarine ramps, instrument panels, seatbacks and energy absorbers that do not currently exist (e.g. absorbers to prevent engine and steering wheel intrusion into the passenger compartment upon high speed crash, headrests, etc).

If desired, the base may define not only cup-shaped recesses, and a channel for supporting the lattice, but also ducts for accommodating electrical wire and drain tubes.

Thus, the disclosed invention offers manufacturing efficiency as compared to deployment of a rigid urethane foam absorber of the same overall volume. The disclosed thermoform absorbing structure incurs tooling costs which may be up to an order of magnitude lower, and thus has a lower costs per piece. As compared to injection moldings, the disclosed thermoformed absorber carries a lower tooling cost.

It is understood, of course, that while the form of the invention herein shown and described constitutes a preferred embodiment of the invention, it is not intended to illustrate all possible forms thereof. It will also be understood that the words used are words of description rather than limitation, and that various changes may be made without departing from the spirit and scope of the invention disclosed.

What is claimed is:

1. A modular energy absorbing assembly for decelerating an object that impacts the assembly, the assembly comprising:
    a base; and
    at least one energy absorbing module associated with the base for accommodating deformation of the assembly, the at least one energy absorbing module comprising a structure selected from the group consisting of a first structure, a second structure, and combinations thereof, wherein the first structure comprises a plurality of channels formed within the base and a lattice of interconnected strands, the strands intersecting to define a plurality of cells and being supported within the channels formed within the base, wherein the first structure is oriented such that the plane of each cell is substantially parallel to the impacting force in order to maximize energy absorption over a given distance, the lattice collapsing and at least some of the cells becoming at least partially closed during energy absorption;
    wherein the second structure comprises a plurality of separated adjacent, curvilinear recesses formed within the base, each having a floor and a wall defined within the base, wherein the second structure is oriented such that the floor of each recess is substantially orthogonal to the impacting force and its wall is substantially parallel to the impacting force in order to maximize energy absorption by the wall over a given distance, the wall at least partially collapsing and at least some of the cups becoming at least partially compressed during energy absorption,
    so that a selection from the first and second structures, and combinations thereof affords a user-determinable resistance of the assembly to impact.

2. The energy absorbing assembly of claim 1, wherein the base comprises a thermoformed plastic.

3. The energy absorbing assembly of claim 1, wherein the second structure includes energy-absorbing portions.

4. The energy absorbing assembly of claim 3, wherein the energy absorbing portions comprise a thermoformed plastic.

5. The energy absorbing assembly of claim 1, wherein the first structure comprises a metal lattice and an injection molded plastic base, wherein the lattice is insert-molded into the base.

6. The energy absorbing assembly of claim 1, wherein the base defines one or more elongated channels into which electrical wiring, tubes, and the like may be placed upon thermoforming.

7. The energy absorbing assembly of claim 1, wherein the first structure is 1–5 cells in height.

8. The energy absorbing assembly of claim 1, further comprising means for attaching the base to a support surface.

9. The energy absorbing assembly of claim 8, wherein the support surface is selected from the group consisting of: a vehicle pillar, a headrail, an instrument panel, a seat, a seat back, an integrated seat restraint mechanism, a door panel, door mounted hardware, a dome light, an overhead console, pillar-mounted safety restraint hardware, a headliner, a bumper, a knee bolster, a seat anti-submarine ramp, and a steering column, the group being associated with a vehicle.

10. The energy absorbing assembly of claim 1, wherein the lattice comprises expanded metal.

11. The energy absorbing assembly of claim 1 wherein the plurality of recesses includes a plurality of cup-shared recesses wherein at least some adjacent recesses are connected by a rib-shaped recess.

12. A modular energy absorbing assembly for decelerating an object that impacts the assembly, the assembly comprising:
    base; and
    at least one energy absorbing module associated with the base for accommodating deformation of the assembly, the at least one energy absorbing module comprising a structure having a plurality of separated adjacent, cup-shaped recesses formed integrally within the base, each having a floor and a wall defined within the base, wherein the structure is oriented such that the floor of each recess is substantially orthogonal to the impacting force and its wall is substantially parallel to the impacting force in order to maximize energy absorption by the wall over a given distance, the wall at least partially collapsing and at least some of the recesses becoming at least partially compressed during energy absorption,
    so that the structure affords a user-determinable resistance of the assembly to impact by a suitable selection of recess geometry.

13. The energy absorbing assembly of claim 12, wherein the recesses are configured as cups that are deployed so that their centers define a quadrilateral in plan view.

14. The energy absorbing assembly of claim 13, further comprising:
    one or more rib-shaped recesses formed between at least some of the cups.

* * * * *

UNITED STATES PATENT AND TRADEMARK OFFICE
CERTIFICATE OF CORRECTION

PATENT NO. : 6,199,942 B1
DATED : March 13, 2001
INVENTOR(S) : Phillip Patrick Carroll, III, et al.

It is certified that error appears in the above-identified patent and that said Letters Patent is hereby corrected as shown below:

<u>Column 10, claim 11,</u>
Line 22, delete "shared" and insert -- shaped --.

Signed and Sealed this

Sixteenth Day of October, 2001

Attest:

*Nicholas P. Godici*

NICHOLAS P. GODICI
*Attesting Officer*   *Acting Director of the United States Patent and Trademark Office*

(12) EX PARTE REEXAMINATION CERTIFICATE (10789th)
United States Patent
Carroll, III et al.

(10) Number: US 6,199,942 C1
(45) Certificate Issued: Jan. 8, 2016

(54) MODULAR ENERGY ABSORBING ASSEMBLY

(75) Inventors: Phillip Patrick Carroll, III, Bloomfield Hills, MI (US); Joel Matthew Cormier, Ferndale, MI (US); Donald Scott Smith, Commerce Township, MI (US); Richard Francois Audi, Dearborn, MI (US)

(73) Assignee: OAKWOOD ENERGY MANAGEMENT, INC., Dearborn, MI (US)

Reexamination Request:
No. 90/012,888, Jun. 10, 2013

Reexamination Certificate for:
Patent No.: 6,199,942
Issued: Mar. 13, 2001
Appl. No.: 09/328,196
Filed: Jun. 8, 1999

Certificate of Correction issued Oct. 16, 2001

Related U.S. Application Data

(63) Continuation-in-part of application No. 09/018,666, filed on Feb. 4, 1998, now Pat. No. 6,017,084.

(51) Int. Cl.
*B60R 21/04* (2006.01)
*B60N 2/68* (2006.01)

(52) U.S. Cl.
CPC ........................................ *B60N 2/68* (2013.01)

(58) Field of Classification Search
None
See application file for complete search history.

(56) References Cited

To view the complete listing of prior art documents cited during the proceeding for Reexamination Control Number 90/012,888, please refer to the USPTO's public Patent Application Information Retrieval (PAIR) system under the Display References tab.

*Primary Examiner* — Russell Stormer (57) ABSTRACT

An energy absorbing assembly is provided for decelerating an object that impacts the assembly. The assembly comprises at least one energy absorbing member for accommodating deformation of the assembly. The assembly comprises a base and at least energy absorbing module associated therewith. The at least one energy absorbing module is formed from a group consisting of structure (A) and structure (B). Structure (A) is a metal lattice which supported by the thermoformed base. Structure (B) comprises of plurality of recesses, each having a floor and a wall. Together, structures (A) and (B) and combinations thereof afford a user-determinable resistance to impact.

EX PARTE REEXAMINATION CERTIFICATE

THE PATENT IS HEREBY AMENDED AS INDICATED BELOW.

AS A RESULT OF REEXAMINATION, IT HAS BEEN DETERMINED THAT:

Claims 1-14 are cancelled.

* * * * *